United States Patent [19]

Bouniot et al.

[11] 3,917,712

[45] Nov. 4, 1975

[54] PROCESS FOR PRODUCING METHACROLEIN

[75] Inventors: Albert Bouniot; Henri Dufour, both of Melle, France

[73] Assignee: Rhone-Poulenc Industries, Paris, France

[22] Filed: June 29, 1974

[21] Appl. No.: 483,139

[30] Foreign Application Priority Data

July 4, 1973 France .............................. 73.24507

[52] U.S. Cl............................................. 260/601 R
[51] Int. Cl.$^2$......................................... C07C 47/20
[58] Field of Search ................................. 260/601 R

[56] References Cited
UNITED STATES PATENTS 3,271,459  9/1966  Brill et al. ........................... 252/437
3,399,246  8/1968  Zrognar............................ 260/680 E
3,468,969  9/1969  Woerner ......................... 260/680 E

FOREIGN PATENTS OR APPLICATIONS 1,340,385  9/1963  France ............................ 260/601 R

*Primary Examiner*—Paul M. Coughlan, Jr.
*Assistant Examiner*—D. B. Springer

[57] ABSTRACT

The invention relates to a process for the catalytic production of methacrolein by oxidation of isobutyraldehyde vapors with an elementary oxygen containing gas. The invention consists in operating in a practically adiabatic manner with introduction of water in the vapor state in the presence of a silver based catalyst deposited on a siliceous carrier.

1 Claim, No Drawings

PROCESS FOR PRODUCING METHACROLEIN

This invention relates to the production of methacrolein by catalytic oxidation of isobutyraldehyde vapors with molecular oxygen.

In accordance with the process of the copending application Ser. No. 849,886, filed Oct. 13, 1969, and entitled "Process for Producing Methacrolein", description is made of a method for producing methacrolein from isobutyraldehyde in which a mixture of isobutyraldehyde vapors and of an elementary oxygen containing gas is brought into contact with a silver based catalyst deposited on a siliceous carrier, at 150°–300°C. Preferably it proceeds continuously by passing the mixture of isobutyraldehyde and of oxygenated gas over the catalyst contained in a tube held at the selected temperature, the contact time of the mixture with the catalyst being within the range of 2–5 seconds. It is carried out at atmospheric pressure or under pressure.

In accordance with the improvement which forms the object of the present invention, the process is carried out by operating in a practically adiabatic manner in the reactor, by introducing therein water in the vapor state which dilutes the reaction mixture and limits the temperature rise (due to the exothermicity of the reaction), of the mixture as it comes out from the catalysis zone. Preferably the amount of water is comprised between 35% and 45% by weight of the isobutyraldehyde and the contact time of the mixture with the catalyst is low, less than 1 second.

An advantage of the improvement consistent with the invention, for yields of the same order of magnitude, is the insurance of a marked increase in conversion rate of the isobutyraldehyde, consequently a large increase of the reactor productivity and greater ease in the further separation of the components of the reaction product.

Another advantage consists in that the presence of steam, in the reaction mixture, allows the operation to be carried out in a realm far from the explosive conditions of the mixture, even in case of an incidental slowdown of the isobutyraldehyde flow-rate.

EXAMPLE

Use is made of a stainless steel cylindrical reactor, having a diameter of 40 cm and a height of 40 cm and charged with catalyst to 20 cm of its height. This reactor is carefully lagged and the bottom on which the catalyst rests is a gas-distribution perforated plate (760 holes of 1.5 mm in diameter). The catalyst is composed of silica having a specific area of 12 $m^2/g$, crushed in granules of about 3 mm and on which 10% by weight of silver has been deposited by impregnation with an aqueous solution of silver nitrate, followed by calcining.

For the process, the mixture of reagents is passed continuously in the gas-vapor phase from bottom to top through the catalytic bed, preferably at about 150°–160°C and at atmospheric pressure. Gases and vapors of the mixture are intimately mixed and the contact time with the catalyst does not add up to 1 second. The pressure drop (10 centimeters of water), caused by the perforated plate, insures sufficiently uniform dispersion of the reaction mixture with the entire section of the catalytic bed.

Thus per hour there are introduced:

22 $m^3$ air (measured under normal conditions)
24.3 kg isobutyraldehyde in vapor form
17 kg steam Under these conditions, the temperature of the reaction mixture, at the outlet from the catalytic bed, is 610°–620°.

After rapidly cooling the mixture, condensing the vapors and washing of the remaining gases, in order to recover thereof the useful products which they still contain, the following components are collected:

| | |
|---|---|
| isobutyraldehyde | 8.36 kg |
| methacrolein | 7.16 kg |
| acetone | 1.55 kg |

These values give the following indications:

| | |
|---|---|
| isobutyraldehyde conversion rate | 65% |
| yield of methacrolein | 46% |
| yield of acetone | 12% |

The flushing gases contain no more oxygen.

The missing isobutyraldehyde, which is not converted into methacrolein and into acetone, can be traced to forms of combustion and cracking products: CO, $CO_2$ and light hydrocarbons.

We claim:

1. A continuous process for adiabatically producing by reacting for less than 1 second the vapors of isobutyraldehyde, molecular oxygen, and water vapor in an amount within the range of 35% to 45% by weight of the isobutyraldehyde at a temperature within the range of 150°–300°C, in the presence of silver catalyst, deposited on a silica carrier, and separating the methacrolein produced.

* * * * *